US 12,255,774 B2

(12) United States Patent
Kosugi et al.

(10) Patent No.: US 12,255,774 B2
(45) Date of Patent: Mar. 18, 2025

(54) NETWORK MANAGEMENT APPARATUS AND NETWORK MANAGEMENT METHOD

(71) Applicant: RAKUTEN MOBILE, INC., Tokyo (JP)

(72) Inventors: Masaaki Kosugi, Tokyo (JP); Jun Okada, Tokyo (JP); Jayoung Oh, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 17/767,139

(22) PCT Filed: Jun. 15, 2021

(86) PCT No.: PCT/JP2021/022745
§ 371 (c)(1),
(2) Date: Apr. 7, 2022

(87) PCT Pub. No.: WO2022/264289
PCT Pub. Date: Dec. 22, 2022

(65) Prior Publication Data
US 2024/0106706 A1    Mar. 28, 2024

(51) Int. Cl.
*H04L 41/0816* (2022.01)
(52) U.S. Cl.
CPC ................. *H04L 41/0816* (2013.01)
(58) Field of Classification Search
None
See application file for complete search history.

(56) References Cited

U.S. PATENT DOCUMENTS

| | | | |
|---|---|---|---|
| 2014/0215029 A1* | 7/2014 | Terwilliger | H04B 5/72 709/220 |
| 2016/0132420 A1* | 5/2016 | Kuo | G06F 9/45558 717/130 |
| 2016/0224409 A1 | 8/2016 | Liu et al. | |
| 2016/0285685 A1* | 9/2016 | Zhou | H04L 41/0816 |
| 2017/0013018 A1* | 1/2017 | Nakata | H04L 12/6418 |
| 2017/0317954 A1* | 11/2017 | Masurekar | H04L 41/0894 |

(Continued)

FOREIGN PATENT DOCUMENTS

| | | |
|---|---|---|
| JP | 2016-533655 A | 10/2016 |
| JP | 2018-533280 A | 11/2018 |

(Continued)

*Primary Examiner* — Fadi Haj Said
(74) *Attorney, Agent, or Firm* — Sughrue Mion, PLLC (57) ABSTRACT

A network management apparatus includes at least one memory configured to store program code; and electric circuitry including at least one processor, the at least one processor being configured to read and operate according to the program code, the electronic circuitry configured to: store configuration information on devices or functions that constitute a virtualized environment of a network; acquire, as property information of the workaround, information associated with one or more devices or one or more functions to which a workaround for a specific hardware or software problem is to be applied; extract the one or more devices or the one or more functions serving as an application target of the workaround by referring to the configuration information based on the property information; and request to execute the workaround with respect to the application target.

13 Claims, 6 Drawing Sheets

(56) References Cited

U.S. PATENT DOCUMENTS

| | | | |
|---|---|---|---|
| 2018/0024852 A1 | 1/2018 | Yabushita et al. | |
| 2018/0081715 A1* | 3/2018 | LeBeane | G06F 9/505 |
| 2018/0212819 A1 | 7/2018 | Zhang et al. | |
| 2018/0249406 A1* | 8/2018 | Tellado | H04L 47/2491 |
| 2019/0220271 A1* | 7/2019 | Olderdissen | G06F 9/45558 |
| 2021/0203602 A1* | 7/2021 | Tanji | H04L 41/5009 |
| 2022/0353140 A1* | 11/2022 | Lee | H04L 41/0853 |

FOREIGN PATENT DOCUMENTS

| | | |
|---|---|---|
| WO | 2015/042937 A1 | 4/2015 |
| WO | 2016/121802 A1 | 8/2016 |
| WO | 2017/018435 A1 | 2/2017 |
| WO | 2017/050130 A1 | 3/2017 |

* cited by examiner

- HARDWARE INFORMATION
    - DEVICE NAME
    - VENDOR NAME
    - PRODUCT CODE
    - ID (e.g., MANUFACTURING SERIAL NUMBER)
    - SOFTWARE INFORMATION ASSOCIATED WITH HARDWARE
        - BMC SOFTWARE VERSION
        - BIOS SOFTWARE VERSION
        - FIRMWARE VERSION
        - FPGA BIT STREAM ID
    - HARDWARE ID
    - IP ADDRESS
    - MAC ADDRESS
- SOFTWARE INFORMATION ASSOCIATED WITH VIRTUALIZAION LAYER
    - OS VERSION
    - SOFTWARE VERSION OF APPLICARTION RUNNING ON OS
    - DRIVER VERSION
    - VIRTUALIZATION LAYER SOFTWARE ID
    - IP ADDRESS
    - MAC ADDRESS
- SOFTWARE INFORMATION ASSOCIATED WITH VIRTUAL MACHINE
    - OS VERSION
    - SOFTWARE VERSION OF APPLICATION RUNNING ON OS
    - VIRTUAL MACHINE ID
    - IP ADDRESS
    - MAC ADDRESS

FIG. 6

NETWORK MANAGEMENT APPARATUS AND NETWORK MANAGEMENT METHOD

CROSS REFERENCE TO RELATED APPLICATIONS

This application is a National Stage of International Application No. PCT/JP2021/022745 filed Jun. 15, 2021.

TECHNICAL FIELD

The present invention relates to a network management apparatus, a network management method, and a program thereof, and in particular to a technique for applying a workaround (WA) to a particular problem in a mobile network.

BACKGROUND ART

With a background of improved performance of general-purpose servers and network infrastructures, cloud computing (hereinafter simply referred to as "cloud"), which on demand uses computing resources that are virtualized on physical resources such as servers, has become widely prevailing. In addition, the Network Function Virtualization (NFV), which virtualizes network functions and provides the virtualized network functions on the cloud, has been well known. The NFV is a technology that uses virtualization and cloud technologies to separate the hardware and software of various network services, which used to run on dedicated hardware, and to run the software on a virtualized infrastructure. It is expected to improve the sophistication of operations and reduce costs by use of those virtualization technologies.

In recent years, the virtualization has been advanced in mobile networks as well.

The European Telecommunications Standards Institute (ETSI) NFV defines the NFV architecture (see, for example, Patent Literature 1).

LISTING OF REFERENCES

Patent Literature

PATENT LITERATURE 1: International Publication of PCT International Patent Application No. WO2016/121802 A

SUMMARY OF THE INVENTION

Problems to be Solved by the Invention

Mobile networks need to meet high reliability and high availability requirements. Therefore, when a problem occurs in the mobile network and a workaround (WA) is to be applied thereto, it is required to apply the same WA not only to the component where the problem actually occurred, but also to other components where similar problems is likely to occur in order to obviate the risk of the occurrence of the problems.

However, recent mobile networks are large-scale networks constructed on a virtualization infrastructure, and many different software versions of applications co-exist throughout the network. In addition, it is required for mobile networks constructed on a virtualization infrastructure to be constructed, operated, and maintained in consideration of both the infrastructure side and the application side. For example, when using a speed-enhancing technology in which virtual machines need to directly access hardware, the virtual machines are tied to the hardware, respectively.

For this reason, it makes it difficult to extract devices and/or functions to which the WA is to be applied from among a large number of devices and/or functions that constitute the virtualized environment expeditiously and exhaustively, and to automate the process of applying the WA to the extracted devices and/or functions.

The present invention has been made in order to solve the above mentioned problems and an object thereof is to provide a network management apparatus, a network management method, and a program thereof capable of deploying a workaround to a specific problem more selectively and expeditiously in a large-scale network constructed on a virtualization infrastructure.

Solution to Problems

In order to solve the above mentioned problems, according to one aspect of the present invention, there is provided a network management apparatus, comprising: a configuration information storage unit configured to store configuration information on devices and/or functions that constitute a virtualized environment of a network; a property information acquisition unit configured to acquire information associated with devices and/or functions to which a workaround for a specific problem is to be applied as property information of the workaround; an application target extraction unit configured to extract devices and/or functions serving as an application target of the workaround by referring to the configuration information stored by the configuration information storage unit based on the property information acquired by the property information acquisition unit; and an execution request unit configured to request to execute the workaround with respect to the application target extracted by the application target extraction unit.

The configuration information stored by the configuration information storage unit may include hardware information of hardware, software information on a virtualization layer, and software information in a virtual machine, as first configuration information that is respective information of the hardware, the virtualization layer, and the virtual machine constituting the virtualized environment.

The configuration information stored by the configuration information storage unit may include at least one of parameter setting information, operational information, network topology information, and physical location information, as second configuration information that is information associated with the hardware, the virtualization layer, and the virtual machine, respectively.

The property information acquisition unit may acquire, as the property information, the configuration information that is common to the devices and/or functions to which the workaround is to be applied; and the application target extraction unit may extract, as the application target, devices and/or functions having configuration information that coincides with configuration information included in the property information acquired by the property information acquisition unit by referring to the configuration information stored by the configuration information storage unit.

The property information acquisition unit may acquire, as the property information, a device name, a vendor name, and a product code of hardware constituting the virtualized environment.

Also, the property information acquisition unit may acquire, as the property information, a version of an OS (Operating System) of a virtualization layer or a virtual machine constituting the virtualized environment, and a software version of an application running on the OS.

The property information acquisition unit acquires, as the property information, a software version of firmware on hardware constituting the virtualized environment, and a software version of an application running on an OS (Operating System) of a virtualization layer or a virtual machine constituting the virtualized environment.

Also, the property information acquisition unit may acquire, as the property information, hardware information on hardware constituting the virtualized environment, and network topology information of the hardware.

Yet also, the property information acquisition unit acquires, as the property information, the configuration information on any one of constituent elements of hardware, a virtualization layer, and a virtual machine constituting the virtualized environment, and continuous operating time of the constituent element.

The network management apparatus may further comprises: an execution plan generation unit configured to generate, when a plurality of application targets are extracted by the application target extraction unit, an execution plan for the workaround in consideration of an execution priority of the workaround for each of the plurality of application targets based on the configuration information of the plurality of application targets and the workaround to be applied to the plurality of application targets, and wherein the execution request unit may request to execute the workaround with respect to the plurality of application targets based on the execution plan generated by the execution plan generation unit.

The network management apparatus may further comprises: a workaround execution unit configured to execute the workaround requested to be executed by the execution request unit with respect to the application target.

According to another aspect of the present invention, there is provided a network management method performed by a network management apparatus, comprising steps of: storing configuration information on devices and/or functions that constitute a virtualized environment of a network; acquiring information associated with devices and/or functions to which a workaround for a specific problem is to be applied as property information of the workaround; extracting devices and/or functions serving as an application target of the workaround by referring to the configuration information based on the property information; and requesting to execute the workaround with respect to the application target.

According to yet another aspect of the present invention, there is provided a network management program for causing a computer to execute network management processing, the program causing the computer to execute processing comprising: a configuration information storage process for storing configuration information on devices and/or functions that constitute a virtualized environment of a network; a property information acquisition process for acquiring information associated with devices and/or functions to which a workaround for a specific problem is to be applied as property information of the workaround; an application target extraction process for extracting devices and/or functions serving as an application target of the workaround by referring to the configuration information stored by the configuration information storage process based on the property information acquired by the property information acquisition process; and an execution request process for requesting to execute the workaround with respect to the application target extracted by the application target extraction process.

Advantageous Effect of the Invention

According to the present invention, it makes it possible to deploy a workaround to a specific problem more selectively and expeditiously in a large-scale network constructed on a virtualization infrastructure.

The above mentioned and other not explicitly mentioned objects, aspects and advantages of the present invention will become apparent to those skilled in the art from the following embodiments (detailed description) of the invention by referring to the accompanying drawings and the appended claims.

DESCRIPTION OF EMBODIMENTS

Hereinafter, embodiments of the present invention will be described in detail with reference to the accompanying drawings. Among the constituent elements disclosed herein, those having the same function are denoted by the same reference numerals, and a description thereof is omitted. It should be noted that the embodiments disclosed herein are illustrative examples as means for implementing the present invention, and should be appropriately modified or changed depending on a configuration and various conditions of an apparatus to which the present invention is applied, and the present invention is not limited to the following embodiments. Furthermore, it should be noted that all of the combinations of features described in the following embodiments are not necessarily essential to the solution of the present invention.

Hereinafter, a non-limiting example will be described in which a network management apparatus according to the present embodiment has a workaround (WA) application management function that extracts devices and/or functions to which a workaround (WA) for a specific problem is to be applied (hereinafter referred to as "WA application target") from among devices and/or functions that constitute the virtualized environment of the mobile network constructed on the virtualization infrastructure, and requests to execute the WA with respect to the extracted WA application target. More particularly, the WA application management function includes a WA application target extraction function that extracts the WA application target in terms of an observation that the same WA should be applied not only to the devices and/or functions that have actually undergone a problem but also to the devices and/or functions that may undergo a similar problem or may be adversely affected by the occurrence of the problem from among devices and/or functions that constitute the virtualized environment.

Here, the term "WA" refers to measures to temporarily avoid a problem or reduce the adverse influence thereof when the problem has occurred in a network, and includes patch-applying processing such as a configuration change of software or an installation of new software. The above problem may occur in any phase of network construction, maintenance, or operation.

It should be noted that, according to the present embodiment, the term "device" refers to a physical device, and the term "function" refers to a function realized by software running on a device. Also, when the term "devices/functions" is used in the following description, it means devices and/or functions.

Figure 1:
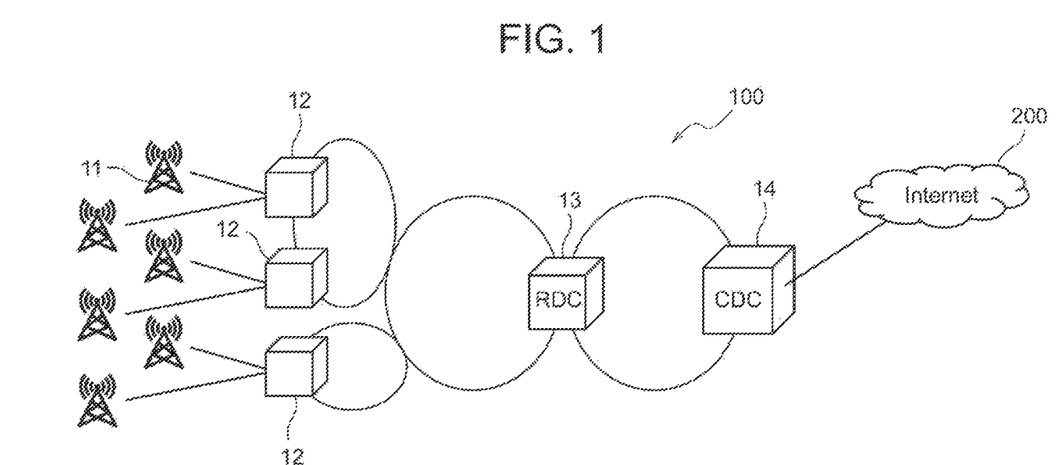
FIG. 1 is a conceptual diagram illustrating an exemplary network configuration of a mobile network including a network management apparatus according to the present embodiment of the present invention.

FIG. 1 is a conceptual diagram illustrating an exemplary network configuration of a mobile network 100 including a network management apparatus according to the present embodiment.

In the mobile network 100 shown in FIG. 1, a mobile communicable terminal such as a smartphone and the Radio Access Network (RAN) communicate with each other wirelessly, and the transmitted information is relayed through the backhaul network (i.e., Mobile Backhaul: MBH) to the core network for processing. This allows the mobile communicable terminal to connect to the Internet 200 or connect to another company's network to make voice calls, or the like.

More particularly, the mobile network 100 includes base stations 11 and a plurality of accommodating stations 12 to 14. In FIG. 1, the accommodating station 12 is an edge data center, the accommodating station 13 is a Regional Data Center (RDC), and the accommodating station 14 is a Central Data Center (CDC). A backhaul network is constituted between the edge data center 12 and the central data center 14.

The mobile network 100 according to the present embodiment is a virtualized network constructed on a virtualization infrastructure. The mobile network 100 realizes everything from the switching equipment of the backbone network to the radio access functions of the base stations by software on general-purpose servers.

The base station 11 is equipped with an antenna, a switchboard, a battery, and the like.

The edge data center 12 is located near the base stations 11 and is connected to a plurality of base stations 11 via fiber-optic cables, or the like. The edge data center 12 realizes the RAN-related radio access functions.

The regional data center 13 is connected to a plurality of edge data centers 12. The regional data center 13 realizes, by software, the firewall/NAT (Network Address Translation), the CDN (Content Distribution Network), and various applications for edge computing.

The central data center 14 is connected to a plurality of regional data centers 13. The central data center 14 realizes core functions such as the EPC (Evolved Packet Core), the IMS (IP Multimedia Subsystem), or the like.

It should be noted that the number of respective data centers (i.e., accommodating stations), that is, the edge data center 12, the regional data center 13, and the central data center 14, is not limited to the number shown in FIG. 1. For example, although only one regional data center 13 and one central data center 14 are shown in FIG. 1, there may be a plurality of regional data centers 13 and central data centers 14, respectively.

Figure 2:
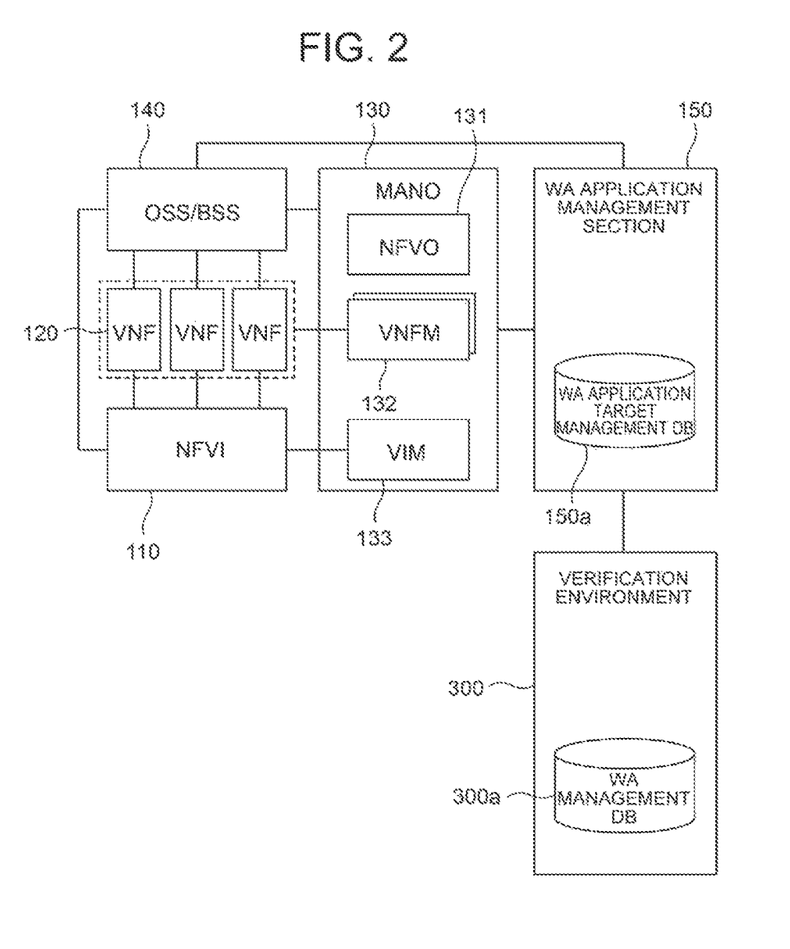
FIG. 2 is a block diagram illustrating an exemplary internal configuration of a network management system.

FIG. 2 is a block diagram illustrating an exemplary internal configuration of a network management system that constitutes the mobile network 100.

Each of constituent elements shown in FIG. 2 has a reference point. The lines connecting the constituent components shown in FIG. 2 indicate that connected constituent elements via the line can send and receive information from each other.

The NFVI (NFV Infrastructure) 110 is a network function virtualization infrastructure, and includes physical resources, a virtualization layer, and virtualized resources. The physical resources include hardware resources such as computing resources, storage resources, and transmission resources. The virtualization layer is a virtualizing layer such as a hypervisor for virtualizing the physical resources and providing the virtualized physical resources to the VNF (Network Function Virtualization) 120. The virtualized resources are the virtualized infrastructure resources provided to the VNF 120.

In other words, the NFVI 110 is an infrastructure that enables flexible handling of hardware resources of physical servers (hereinafter also simply referred to as "servers"), such as computing, storage, and network functions, as virtualized hardware resources such as virtualized computing, virtualized storage, and virtualized network, which are virtualized by the virtualization layer such as the hypervisor.

A plurality of servers that constitute the NFVI 110 are grouped together and deployed in each of the data centers 12 to 14. The number, the placement positions, wiring, and the like, of the servers to be deployed in each of the data centers 12 to 14 are predetermined depending on the type of data center (i.e., accommodating station type). In each of the data centers 12 to 14, the deployed servers are connected by an internal network and are capable of sending and receiving information from each other. In addition, the data centers are connected to each other by a network, and the servers in different data centers are capable of sending and receiving information from each other via the network.

The VNF 120 corresponds to applications running on virtual machines (VMs) on the servers and implements the network functions by software. Although not specifically shown, each VNF 120 may be provided with a management function called an EM (Element Manager).

The NFVI 110 and the VNF 120 in FIG. 2 constitute the virtualized environment. In other words, the virtualized environment is constituted with three layers, in order from the lower layer; the hardware, the virtualization layer, and virtual machines.

The MANO (Management and Orchestration) 130 has management and orchestration functions for the virtualized environment. The MANO 130 includes the NFVO (NFV-Orchestrator) 131, the VNFM (VNF-Manager) 132, and the VIM (Virtualized Infrastructure Manager) 133.

The NFVO 131 orchestrates the NFVI resources, manages the lifecycle of network services, and provides integrated operational management of the entire system. The NFVO 131 is capable of performing processing in response to instructions from the OSS/BSS (Operation Support System/Business Support System) 140, which will be described below.

The VNFM 132 manages the lifecycle of each of the VNFs 120. It should be noted that the VNFM 132 may be arranged in the MANO 130 as a dedicated VNFM corresponding to each of VNFs 120. Alternatively, a single VNFM 132 may manage the lifecycle of two or more VNFs 120. In this case, the VNFM 132 may be a general-purpose VNFM that supports VNFs 120 provided by different vendors.

The VIM 133 performs operational management of the resources of the VNFs 120.

The OSS/BSS 140 is an integrated management system for the mobile network 100.

Here, the OSS is a system (i.e., equipment, software, mechanism, and the like) necessary for constructing and operating the desired services, and the BSS is an information system (i.e., equipment, software, mechanism, and the like) used for billing, invoicing, and customer services.

The WA application management section 150 realizes a WA application management function in which the WA application management section 150 receives a WA application request sent from the verification environment 300, which will be described below, extracts devices/functions to which the WA is to be applied as WA application targets from among all devices/functions that constitute the virtualized environment of the mobile network 100, and requests the OSS/BSS 140 to execute the WA with respect to the extracted WA application targets. The WA application management section 150 constitutes the network management apparatus according to the present embodiment.

The WA application management section 150 is equipped with a WA application target management database (DB) 150*a*. The WA application management section 150 extracts the WA application targets by referring to the WA application target management database 150*a* based on the information included in the WA application request.

The WA application target management database 150*a* is a configuration information storage unit that stores configuration information of all devices/functions that constitute the virtualized environment of the mobile network 100. The WA application target management database 150*a* may be constituted with a volatile memory, or the like, that acquires the above configuration information from an external device and stores the acquired configuration information temporarily.

It should be noted that the WA application target management database 150*a* is not limited to the one that exhaustively manages the configuration information of the entire mobile network 100. It may be sufficient for the WA application target management database 150*a* to manage at least the configuration information of devices/functions that constitute the network to be managed within the entire mobile network 100.

It also should be noted that the WA application management section 150 is not limited to being an external function of the OSS/BSS 140 or the MANO 130 as shown in FIG. 2. The WA application management section 150 may be provided inside the OSS/BSS 140 or alternatively inside the MANO 130 (for example, inside the NFVO 131). In this case, the WA application management function of the WA application management section 150 is a part of the functions of the OSS/BSS 140 or the MANO 130.

The verification environment 300 is an environment to verify the execution operation of the WAs. The verification environment 300 is an environment to verify whether or not the WA generated to address a specific problem in the mobile network 100 is the correct and workable one, in other words, whether or not the WA is capable of solving the above problem.

The verification environment 300 is equipped with a WA management database (DB) 300*a*. The WA management database 300*a* is a database that manages the WAs, and also manages the WA IDs (i.e., IDs of WAs), the WA information, and the WA property information, with being correlated to the WAs, respectively.

Here, the WA ID is an ID to identify each WA. The WA information is the source code of the program, binary files, configuration files, and the like, required to execute the WA.

The WA property information is information necessary for extracting one or a plurality of WA application targets by the WA application management section 150, and includes information associated with devices/functions to which the WA is to be applied. More particularly, the WA property information includes configuration information common to devices/functions that may undergo the problem corresponding to the WA or that may be adversely affected by the occurrence of the problem.

When the execution operation of the WA is verified in the verification environment 300, the verification environment 300 sends out the WA application request. The sent WA application request includes the WA ID of the WA to be applied and the WA property information of the WA to be applied.

When a certain problem occurs in a specific device/function, the process of analyzing the cause of the problem will reveal which devices/functions are likely to undergo the same problem. For example, when a certain problem has occurred in a specific device, it is possible to determine that the same problem is likely to occur in devices of the same model. Likewise, when a certain problem has occurred in a specific function, it is possible to determine that the same problem is likely to occur in functions implemented by the software of the same version.

Therefore, according to the present embodiment, the configuration information common to the devices/functions that may undergo the certain problem, which has been found in the process of analyzing the cause of the problem as described above, is included in the WA application request as the WA property information, and sent from the verification environment 300 to the WA application management section 150.

For example, when a certain problem occurs in a specific device and it is determined that the same problem is likely to occur in devices of the same model, the verification environment 300 includes, as the WA property information, the model name (e.g., device name) of the devices that are likely to undergo the same problem into the WA application request and send the WA application request to the WA application management section 150. In this case, the WA application management section 150 may appropriately extract devices to which the WA is to be applied by searching the WA management database 300*a* using the acquired device name, or the like, as a key. In addition, the WA application management section 150 is capable of requesting the OSS/BSS 140 to execute the WA such that the WA specified by the WA ID included in the WA application request is applied to the extracted WA application targets. This ensures that the WA is appropriately applied to the devices to which the WA is to be applied.

It should be noted that, in the verification environment 300, the processing from verifying the execution operation of the WA to sending the WA application request may be performed automatically, or alternatively, a person (such as an administrator) may check the result of the WA operation verification and then instruct the WA application request to be sent.

Figure 3:
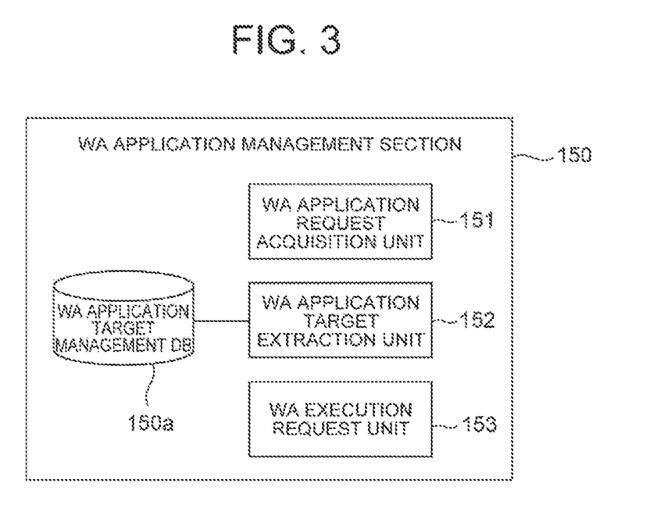
FIG. 3 is a block diagram illustrating an exemplary functional configuration of a WA application management section according to the present embodiment.

FIG. 3 is a block diagram illustrating an exemplary functional configuration of the WA application management section 150.

As shown in FIG. 3, the WA application management section 150 includes a WA application request acquisition unit 151, a WA application target extraction unit 152, and a WA execution request unit 153.

The WA application request acquisition unit 151 acquires the WA application request including the WA ID and the WA property information from the verification environment 300. The WA application request acquisition unit 151 functions as a property information acquisition unit to acquire the WA property information.

The WA application target extraction unit 152 extracts one or a plurality of WA application targets by referring to the WA application target management database 150a based on the WA property information included in the WA application request acquired by the WA application request acquisition unit 151.

The WA execution request unit 153 requests the OSS/BSS 140 to execute the WA with respect to the WA application targets extracted by the WA application target extraction unit 152.

Figure 4:
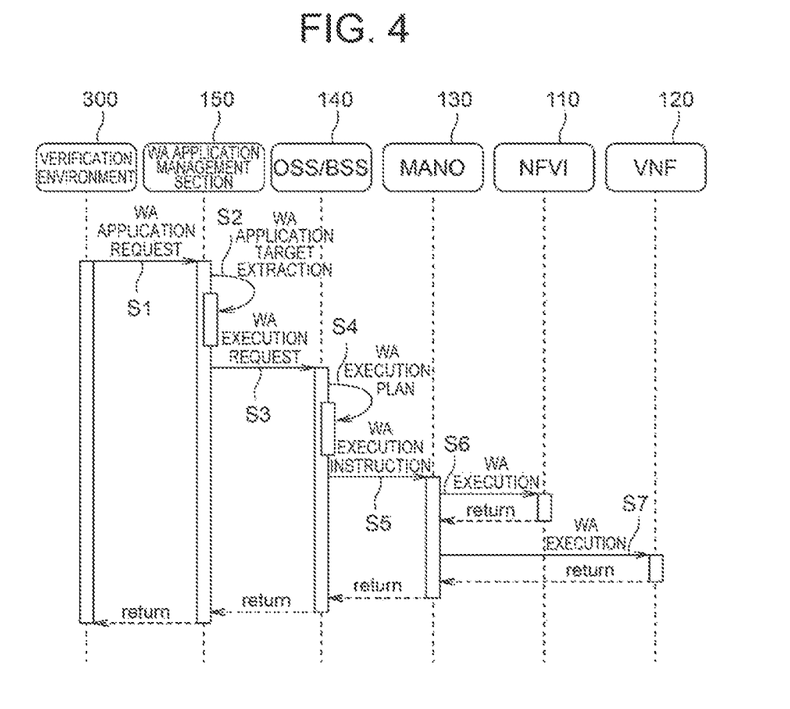
FIG. 4 is a sequence chart illustrating an exemplary sequence of a WA application operation.

FIG. 4 is a sequence chart illustrating an exemplary sequence of the WA application operation.

First, in step S1, the WA application request acquisition unit 151 of the WA application management section 150 receives the WA application request from the verification environment 300, and acquires the WA ID and the WA property information included in the WA application request.

In step S2, the WA application target extraction unit 152 of the WA application management section 150 extracts one or a plurality of WA application targets by referring to the WA application target management database 150a based on the WA property information acquired in step S1.

Figure 5:
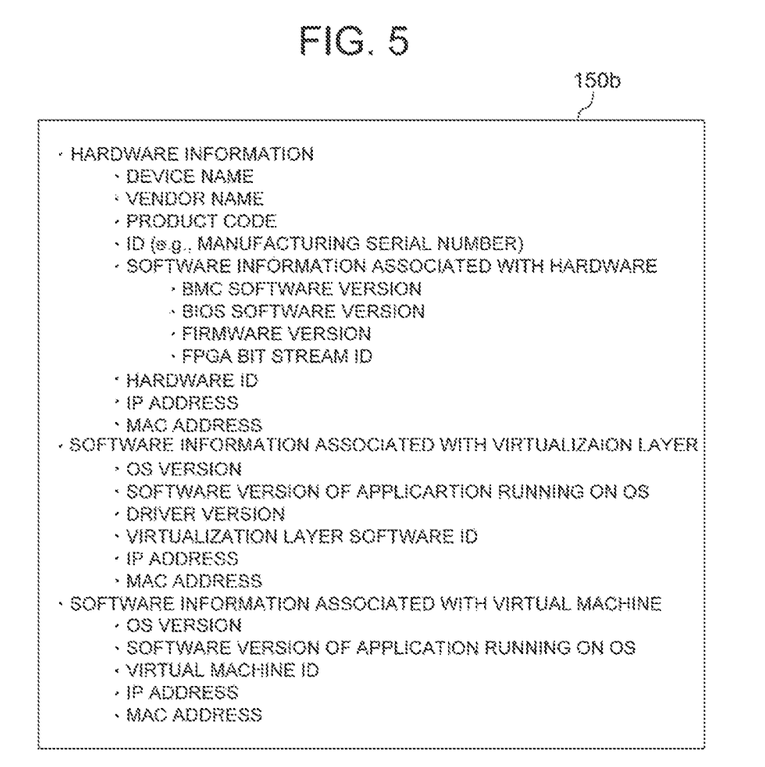
FIG. 5 is a schematic diagram illustrating an exemplary description of first configuration information stored in a WA application target management database.
Figure 6:
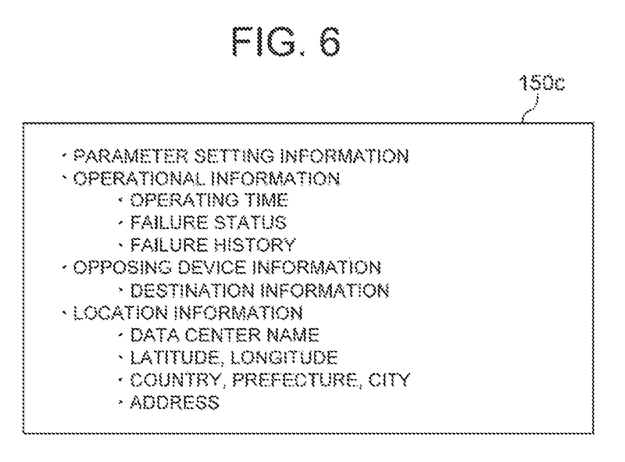
FIG. 6 is a schematic diagram illustrating an exemplary description of second configuration information stored in the WA application target management database.

FIGS. 5 and 6 are schematic diagrams illustrating an exemplary description of the configuration information of devices/functions managed by the WA application target management database 150a.

The configuration information managed by the WA application target management database 150a includes first configuration information 150b shown in FIG. 5 and second configuration information 150c shown in FIG. 6. The first configuration information 150b is respective information on three layers of hardware, a virtualization layer, and a virtual machine that constitute the virtualized environment. The second configuration information 150c is information associated with the above three layers, respectively, and is tied to each of the three layers.

Here, the first configuration information 150b includes hardware information, software information on the virtualization layer, and software information in the virtual machine. The second configuration information 150c includes parameter setting information based on the first configuration information 150b, operational information, information on the opposing devices (i.e., network topology information), and location information (i.e., physical location information).

Among the information included in the first configuration information 150a shown in FIG. 5, the hardware identification information (e.g., a hardware ID, an IP address, a MAC address, or the like), identification information of the software associated with the virtualization layer (e.g., an ID of the virtualization layer software, an IP address, a MAC address, or the like), identification information of the virtual machine (e.g., an ID of the virtual machine, an IP address, a MAC address, or the like) are essential information.

It should be noted that the configuration information shown in FIGS. 5 and 6 is no more than exemplary. For example, the WA application target management database 150a may manage only a part of the configuration information shown in FIGS. 5 and 6 (for example, only the first configuration information 150b), or alternatively may manage other configuration information in addition to the configuration information shown in FIGS. 5 and 6.

In step S2 of FIG. 4, the WA application target extraction unit 152 searches the WA application target management database 150a for an entry with the WA property information included in the WA application request, and extracts the devices/functions corresponding to the searched entry as the WA application target. Here, the WA application target extraction unit 152 extracts one or a plurality of WA application targets.

In step S3, the WA execution request unit 153 of the WA application management section 150 sends the WA execution request to the OSS/BSS 140. The WA execution request includes a list of the identification information of the WA application target (the ID, or the like, assigned to the device/function) extracted in step S2, and the WA ID included in the WA application request acquired in step S1.

In step S4, the OSS/BSS 140 generates a WA execution plan, which describes when to execute the WA for which devices/functions, based on the received WA execution request.

More particularly, the OSS/BSS 140 generates, as the WA execution plan, a list of the WA application targets in which the WA execution order is sorted in consideration of the WA execution priority for each of the WA application targets, the WA ID, and the WA execution time predictions, based on the WA application target list and the WA ID included in the WA execution request. For example, the OSS/BSS 140 uses the range of services provided by each of WA application targets and/or the number of users accommodated by the provided service as an indicator to determine the WA execution priority, and sorts the WA execution order starting with the WA application target that has the least impact on the service operation.

It should be noted that the generation of the WA execution plan may be performed by the WA application management section 150 automatically, or alternatively by a person (such as administrator) manually.

In step S5, the OSS/BSS 140 instructs the MANO 130 to execute the WA based on the generated WA execution plan.

Subsequently, the MANO 130 executes the WA with respect to at least one of the NFVI 110 and the VNF 120 depending on the WA application target. More particularly, when the WA is applied to the NFVI 110, the NFVI 131 of the MANO 130 instructs the VIM 133 to execute the WA, and the VIM 133 executes the WA with respect to the NFVI 110 (in step S6). On the other hand, when the WA is applied to the VNF 120, the NFVO 131 of the MANO 130 instructs the VNFM 132 to execute the WA, and the VNFM 132 executes the WA with respect to the VNF 120 (in step S7).

It should be noted that the OSS/BSS 140 and the MANO 130 may acquire the correspondence information that correlates the WA ID to the WA information (e.g., a source code, a binary file, a configuration file, or the like) from a storage device or the outside.

In the above embodiment, a certain case has been described in which the WA is executed from the OSS/BSS 140 to the NFVI 110 through the MANO 130 in steps S5 and S6. However, alternatively, instructions to execute the WA may be issued as appropriate using available reference points, such as WA execution from the OSS/BSS 140 directly to the NFVI 110.

Furthermore, although in the above embodiment, a certain case has been described in which the OSS/BSS 140 instructs MANO 130 to execute the WA, alternatively, the WA application management section 150 may instruct the MANO 130 to execute the WA. Yet alternatively, the WA application management section 150 may have the WA execution function of the MANO 130.

When the execution of the WA is completed, the NFVI 110 or the VNF 120 returns a return signal indicating that the execution of WA has been completed. Although FIG. 4 shows an example of returning the return signal to the verification environment 300, it is sufficient to return the return signal at least to the OSS/BSS 140 that instructed the WA execution.

Hereinafter, more specific examples of extracting the WA application targets will be described in more detail.

Example 1

Example 1 is an example of a case in which, for a specific problem, the verification environment 300 determines that a similar problem is likely to occur with specific hardware.

In this case, the verification environment 300 sends, as the WA property information, the WA application request including the hardware information of the above specific hardware, specifically the device name, the vendor name and the product code, to the WA application management section 150.

Subsequently, the WA application management section 150 refers to the WA application target management database 150a and extracts, as the WA application targets, the devices that have the same configuration information as the configuration information acquired as the WA property information. In other words, the WA application management section 150 selects all devices of which device name, vendor name, and product code all coincide with those of the WA property information described in the WA application request, and excludes, from the WA application targets, devices for which at least one of the device name, vendor name and product code does not coincide with those of the WA property information described in the WA application request.

Subsequently, the WA application management section 150 requests the OSS/BSS 140 to execute the WA with respect to the extracted WA application targets. As a result, the WA execution plan is generated by the OSS/BSS 140, and based on the generated WA execution plan, the WA is executed with respect to the WA application targets.

As described above, the WA application management section 150 acquires, as the WA property information, the hardware information common to devices that may undergo the specific problem, and extracts devices having the configuration information that coincides with the acquired hardware information as the WA application targets. As a result, it makes it possible to extract devices that may undergo the specific problem from among a large number of devices/functions expeditiously and exhaustively so as to deploy the WA appropriately.

Example 2

Example 2 is an example of a case in which, for a specific problem with the OS, the verification environment 300 determines that a similar problem is likely to occur with a specific version of the OS, and furthermore, determines that, when the OS is patched as a WA for fixing the problem, a specific version of applications running on the OS also need to be modified to accommodate the patch.

In this case, the verification environment 300 sends, as the WA property information, the WA application request including the OS version and the software version of the applications running on the OS to the WA application management section 150. The above software information included in the WA property information may be software information on the virtualization layer or software information within the virtual machine.

Subsequently, the WA application management section 150 refers to the WA application target management database 150a and extracts, as the WA application targets, the functions that have the same configuration information as the configuration information acquired as the WA property information. In other words, the WA application management section 150 extracts, as the WA application targets, all functions of which OS version and software version of the application running on the OS all coincide with those of the WA property information described in the WA application request.

Yet subsequently, the WA application management section 150 requests the OSS/BSS 140 to execute the WA with respect to the extracted WA application targets. As a result, the WA is executed with respect to the WA application targets.

As described above, the WA application management section 150 acquires, as the WA property information, software information that is common to functions that may undergo the specific problem, and extracts, as the WA application targets, functions having configuration information that coincides with the acquired software information. As a result, it makes it possible to extract functions that may undergo the specific problem from among a large number of devices/functions expeditiously and exhaustively so as to deploy the WA appropriately.

In addition, by acquiring the OS version and the software version of the application as the WA property information, as described above, it makes it possible to extract the WA application targets appropriately in consideration of the combination of the OS and the applications running on the OS.

Example 3

Example 3 is an example of a case in which, for a specific problem with an application, the verification environment 300 determines that it is necessary to change the version of the BIOS and the application because the combination of a specific version of the BIOS and a specific version of the application is likely to cause the problem with the application concerned.

In this case, the verification environment 300 sends, as the WA property information, the WA application request including the BIOS software version and the software version of the application running on the OS to the WA application management section 150. Here, the software version of the above application included in the WA property information may be the software version of the application running on the OS of the virtualization layer, or the software version of the application running on the OS of the virtual machine.

Subsequently, the WA application management section 150 refers to the WA application target management database 150a and extracts, as the WA application targets, at least one of the devices and functions that have the same configuration information as the configuration information acquired as the WA property information.

Yet subsequently, the WA application management section 150 requests the OSS/BSS 14 to execute the WA with respect to the extracted WA application targets. As a result, the WA is executed with respect to the WA application targets.

As described above, it makes it possible to extract the WA application targets appropriately in consideration of the combination of hardware and software. For example, by extracting the WA application targets in consideration of the combination of hardware information and software information in the virtual machine, it makes it possible to apply the WA appropriately even when the virtual machine is tied to the hardware, such as when the virtual machine uses a speed-enhancing technology that directly accesses the hardware.

Example 4

Example 4 is an example of a case in which, for a specific problem with the hardware, the verification environment 300 determines that not only the problem occurs in a specific device, but the problem is also likely to adversely affect devices connected to the device concerned.

In this case, the verification environment 300 sends, as the WA property information, the WA application request including the hardware information and opposing device information (i.e., connection destination information) to the WA application management section 150. The above hardware information is the hardware information of the above-mentioned specific device that has undergone the problem or is likely to undergo the problem, and the above opposing device information is the information on devices that are adjacent to the above-mentioned specific device in terms of the network topology.

Subsequently, the WA application management section 150 refers to the WA application target management database 150a and extracts, as the WA application targets, devices having configuration information that coincides with (matches) the configuration information acquired as the WA property information. More particularly, the WA application management section 150 extracts, as the WA application targets, the devices of which hardware information coincides with the hardware information described in the acquired WA application request, and the devices that are adjacent to those devices in terms of the network topology.

Yet subsequently, the WA application management section 150 requests the OSS/BSS 140 to execute the WA with respect to the extracted WA application targets. As a result, the WA is executed with respect to the WA application targets.

As described above, it makes it possible to extract the WA application targets appropriately in consideration of the network topology. Therefore, the WA can be applied appropriately and exhaustively to the extent being affected by the specific problem. Although a certain example of hardware has been described above, the same applies to the virtualization layers and virtual machines in which functions of the WA application targets can be similarly extracted.

Example 5

Example 5 is an example of a case in which, for a specific problem, the verification environment 300 determines that the problem occurs when the continuous operating time exceeds a certain period of time.

In this case, the verification environment 300 sends, as the WA property information, the WA application request including the first configuration information 150b of one of the constituent elements of hardware, virtualization layer, and virtual machine (i.e., hardware information, software information on the virtualization layer, or software information in the virtual machine), and also operational information of the constituent element concerned to the WA application management section 150.

Here, the above operational information may be the continuous operating time (e.g., upper limit of the operating time) during which a problem is considered to actually occur, or alternatively may be the continuous operating time in which a predetermined margin is added to the upper limit of the operating time. In the former case, using, as the WA application determination threshold, the time with a predetermined margin set to the upper limit of the operating time acquired as the operational information, it is possible to determine that the WA is required to be applied when the operating time reaches the WA application determination threshold. On the other hand, in the latter case, using, as the WA application determination threshold, the continuous operating time acquired as the operational information, it is possible to determine that the WA is required to be applied when the operating time reaches the WA application determination threshold.

It should be noted that the above margin time is preferably set to be long enough to allow the WA to be executed before the problem actually occurs, taking into account the time lag from the extraction of the WA application targets and the execution of the WA.

The WA application management section 150 refers to the WA application target management database 150a and extracts, as the WA application targets, devices or functions having the configuration information that coincides with (matches) the configuration information acquired as the WA property information. More particularly, the WA application management section 150 extracts, as the WA application targets, the devices or functions of which configuration information coincides with the configuration information described in the WA application request and also of which operating time have reached the WA application determination threshold. The operating time managed by the WA application target management database 150a may be, for example, measured and updated by the alive monitoring function by the OSS/BSS 140.

Subsequently, the WA application management section 150 requests the OSS/BSS 140 to execute the WA with respect to the extracted WA application targets. As a result, the WA is executed with respect to the WA application targets.

The above operational information may also be used as an indicator to determine the priority of WA execution in the generation of the WA execution plan. For example, the longer the operating time, in other words, the closer to the upper limit of the operating time when a problem is considered to actually occur, the higher the priority of WA execution is assumed to be, and the earlier the order of WA execution may be set to be. This makes it possible to prevent problems from occurring more reliably and proactively.

It should be noted that the above-described examples are no more than exemplary, and the verification environment 300 may combine the configuration information shown in FIG. 5 as appropriate, depending on the WA to be applied, into the WA property information to be included in the WA application request and send the WA application request to the WA application management section 15.

For example, when the verification environment 300 determines that a certain problem occurs in a specific device belonging to a specific region (e.g., a specific data center, a specific prefecture, or the like), the verification environment 300 may send the WA application request including the hardware information and the location information (i.e., physical location information) as the WA property information to the WA application management section 150.

As described above, the WA application management section 150, which is a network management apparatus according to the present embodiment, acquires, as the WA property information, information associated with devices/functions to which the WA is to be applied for a specific problem, and refers to the WA application target management database 150a based on the acquired WA property information to extract the WA application targets. Subsequently, the WA application management section 150 requests the OSS/BSS 140 to execute the WA with respect to the extracted WA application targets.

Here, the WA application target management database 150a manages the configuration information of all devices/functions that constitute the virtualized environment of the network, as shown in FIG. 5. More particularly, the configuration information managed by the WA application target management database 150a includes the first configuration information 150b that is respective information on the hardware, the virtualization layer, and the virtual machines constituting the virtualized environment, and the second configuration information 150c that is associated with the hardware, the virtualization layer, and the virtual machines, respectively.

Telecom networks are constructed on the virtualization infrastructure, and the virtualized environment thereof is constituted with three layers: hardware, virtualization layer, and virtual machines. A characteristic of network operations of the telecom networks is that the network operations are performed on both the infrastructure and application sides, thus it is required to consider the configuration information on the infrastructure side and the configuration information on the application side when constructing, operating, and maintaining the telecom networks. For example, a certain case may be assumed where, although a specific patch is to be applied to the infrastructure, the patch cannot be applied during a specific application is running on the infrastructure. In this case, the linkage among the above three layers needs to be considered when identifying the WA application targets.

In addition, since telecom networks are large-scale and many different software versions co-exist throughout the telecom network, the above co-existing different software versions need to be taken into account when identifying the WA application targets.

According to the present embodiment, the WA application management section 150 checks the WA property information with the WA application target management database 150a, which manages the configuration information of all devices/functions that constitute the virtualized environment so as to extract the WA application targets. Therefore, it makes it possible to expeditiously and exhaustively identify, from the entire mobile network 100, the environment in which a problem similar to the problem that has occurred (or is considered to occur) locally in the mobile network 100 is likely to occur, and the environment that may be adversely affected when such a problem occurs, in consideration of the linkage, software versions, and the like, of the above three layers. Then, it makes it possible to automatically apply the WA with respect to the identified environments.

As described above, it makes it possible to selectively deploy the WAs for the locally occurred problem to the entire network expeditiously and exhaustively. In other words, it makes it possible to horizontally deploy the WAs expeditiously and exhaustively. As a result, it makes it possible to prevent the problem from occurring in the entire network and ensure the availability of the entire network.

Furthermore, the WA application targets are automatically extracted and the WA is automatically executed with respect to the extracted WA application targets, it makes it possible to reduce the operations required for extracting the WA application targets and executing the WA.

Here, as the WA property information, it is possible to acquire the configuration information common to the devices/functions to which the WA is to be applied. In this case, by referring to the WA application target management database 150a, which manages the configuration information of all devices/functions that constitute the virtualized environment, it makes it possible to extract, as the WA application targets, the devices/functions having configuration information that coincides with the configuration information included in the WA property information. As a result, it makes it possible to extract the WA application targets more easily and appropriately.

Yet furthermore, according to the present embodiment, when a plurality of WA application targets are extracted, it makes it possible to generate the WA execution plan in consideration of the WA execution priority for each of the WA application targets based on the configuration information of the extracted WA application targets and the WA to be applied to the WA application targets concerned. Here, the WA execution plan may be generated in consideration of the scope and scale of services that may be adversely affected when a problem occurs, and the estimated time until the problem occurs.

As a result, it makes it possible to execute the WA with respect to a plurality of WA application targets in the appropriate order, and thus to ensure the availability of the entire network more appropriately.

The network management apparatus according to the present embodiment may be implemented in any of general-purpose servers that constitute the backhaul network, the core network, or the like, of the mobile network 100. Alternatively, the network management apparatus may be implemented in a dedicated server. The network management apparatus may also be implemented on a single or a plurality of computers.

When the network management apparatus is implemented on a single computer, the network management apparatus may include a CPU, a ROM, a RAM, an HDD, an input unit (e.g., keyboard, pointing device, or the like), a display unit (e.g., monitor, or the like), a communication I/F, and the like. In this case, at least a part of the functions of the constituent elements of the WA application management section 150 shown in FIG. 3 may be performed by executing the program by the above CPU. However, at least a part of the constituent elements of the WA application management section 150 shown in FIG. 3 may be operated as dedicated hardware. In this case, the dedicated hardware operates based on the control of the above CPU.

Although certain embodiments have been described above, the embodiments described are merely illustrative and are not intended to limit the scope of the present invention. The apparatus and methods described herein may be embodied in other forms than those described above. In addition, without departing from the scope of the present invention, omissions, substitutions, and modifications may be made to the above embodiments as appropriate. Such omissions, substitutions, and modifications fall within the scope of the appended claims and equivalents thereof, and fall within the technical scope of the present invention.

REFERENCE SIGNS LIST

11: Base Station; 12: Edge Data Center; 13: Regional Data Center; 14: Central Data Center; 100: Mobile Network; 110: NFVI; 120: VNF; 130: MANO; 131: NFVO; 132: VNFM; 133: VIM; 140: OSS/BSS; 150: WA Application Management Section; 150a: WA Application Target Management Database; 151: WA Application Request Acquisition Unit; 152: WA Application Target Extraction Unit; 153: WA Execution Request Unit; 300: Verification Environment

What is claimed is:

1. A network management apparatus, comprising:
at least one memory configured to store program code; and
electric circuitry including at least one processor, the at least one processor being configured to read and operate according to the program code, the electronic circuitry configured to:
store configuration information on devices or functions that constitute a virtualized environment of a network;
acquire, as property information of a workaround, information associated with one or more devices or one or more functions to which the workaround for a specific hardware or software problem is to be applied, the specific hardware or software problem determined to occur based on determining that a continuous operating of a constituent element associated with the specific hardware are or software exceeds a predetermined time period;
extract the one or more devices or the one or more functions serving as an application target of the workaround by referring to the configuration information based on the property information; and
request to execute the workaround with respect to the application target,
wherein the configuration information includes first configuration information and second configuration information tied to the first configuration information, the first configuration information including information of hardware, a virtualization layer, and a virtual machine constituting the virtualized environment, and the second configuration information including at least one of parameter setting information, operational information, network topology information, and physical location information.

2. The network management apparatus according to claim 1, wherein
the acquired property information comprises the stored-configuration information that is common to the one or more devices or the one or more functions to which the workaround is to be applied; and
wherein the application target is associated with the one or more devices or the one or more functions having the stored-configuration information that coincides with the configuration information included in the property information.

3. The network management apparatus according to claim 2, wherein
the property information comprises a device name, a vendor name, and a product code of hardware constituting the virtualized environment.

4. The network management apparatus according to claim 2, wherein
the property information comprises a version of an OS (Operating System) of a virtualization layer or a virtual machine constituting the virtualized environment, and a software version of an application running on the OS.

5. The network management apparatus according to claim 2, wherein
the property information comprises a software version of firmware on hardware constituting the virtualized environment, and a software version of an application running on an OS (Operating System) of a virtualization layer or a virtual machine constituting the virtualized environment.

6. The network management apparatus according to claim 2, wherein
the property information comprises hardware information on hardware constituting the virtualized environment, and network topology information of the hardware.

7. The network management apparatus according to claim 2, wherein
the property information comprises the configuration information on any one of constituent elements of hardware, a virtualization layer, and a virtual machine constituting the virtualized environment, and the continuous operating time of the constituent element.

8. The network management apparatus according to claim 1, the electric circuitry further configured to:
generate, based on a determination a plurality of application targets are extracted, an execution plan for the workaround in consideration of an execution priority of the workaround for each of the plurality of application targets based on the configuration information of the plurality of application targets and the workaround to be applied to the plurality of application targets, and
request an execution request to execute the workaround of each application target of the plurality of application targets based on the execution plan.

9. The network management apparatus according to claim 1, the electric circuitry further configured to:
execute the workaround requested to be executed with respect to the application target.

10. A network management method performed by a network management apparatus, comprising steps of:
storing configuration information on devices or functions that constitute a virtualized environment of a network;
acquiring, as property information of the workaround, information associated with one or more devices or one or more functions to which a workaround for a specific hardware or software problem is to be applied, the specific hardware or software problem determined to occur based on determining that a continuous operating of a constituent element associated with the specific hardware or software exceeds a predetermined time period;
extracting the one or more devices or the one or more functions serving as an application target of the workaround by referring to the configuration information based on the property information; and
requesting to execute the workaround with respect to the application target,
wherein the configuration information includes first configuration information and second configuration information tied to the first configuration information, the first configuration information including information of hardware, a virtualization layer, and a virtual machine constituting the virtualized environment, and the second configuration information including at least one of parameter setting information, operational information, network topology information, and physical location information.

11. A non-transitory computer readable medium having instructions stored therein, which when executed by a processor in a network management apparatus cause the processor to execute:
　a configuration information storage process for storing configuration information on devices or functions that constitute a virtualized environment of a network;
　a property information acquisition process for acquiring, as property information of the workaround, information associated with one or more devices or one or more functions to which a workaround for a specific hardware or software problem is to be applied, the specific hardware or software problem determined to occur based on determining that a continuous operating of a constituent element associated with the specific hardware or software exceeds a predetermined time period;
　an application target extraction process for extracting the one or more devices or the one or more functions serving as an application target of the workaround by referring to the configuration information stored by the configuration information storage process based on the property information acquired by the property information acquisition process; and
　an execution request process for requesting to execute the workaround with respect to the application target extracted by the application target extraction process,
　wherein the configuration information includes first configuration information and second configuration information tied to the first configuration information, the first configuration information including information hardware, a virtualization layer, and a virtual machine constituting the virtualized environment, and the second configuration information including at least one of parameter setting information, operational information, network topology information, and physical location information.

12. The network management apparatus of claim 1, wherein the workaround is associated with an execution plan that specifies an execution time prediction for executing the workaround for the one or more devices or the one or more functions serving as the application target.

13. The network management apparatus of claim 12, wherein the execution plan further specifies an execution priority of the workaround for the one or more devices or the one or more functions serving as the application target.

* * * * *